Figure 1:
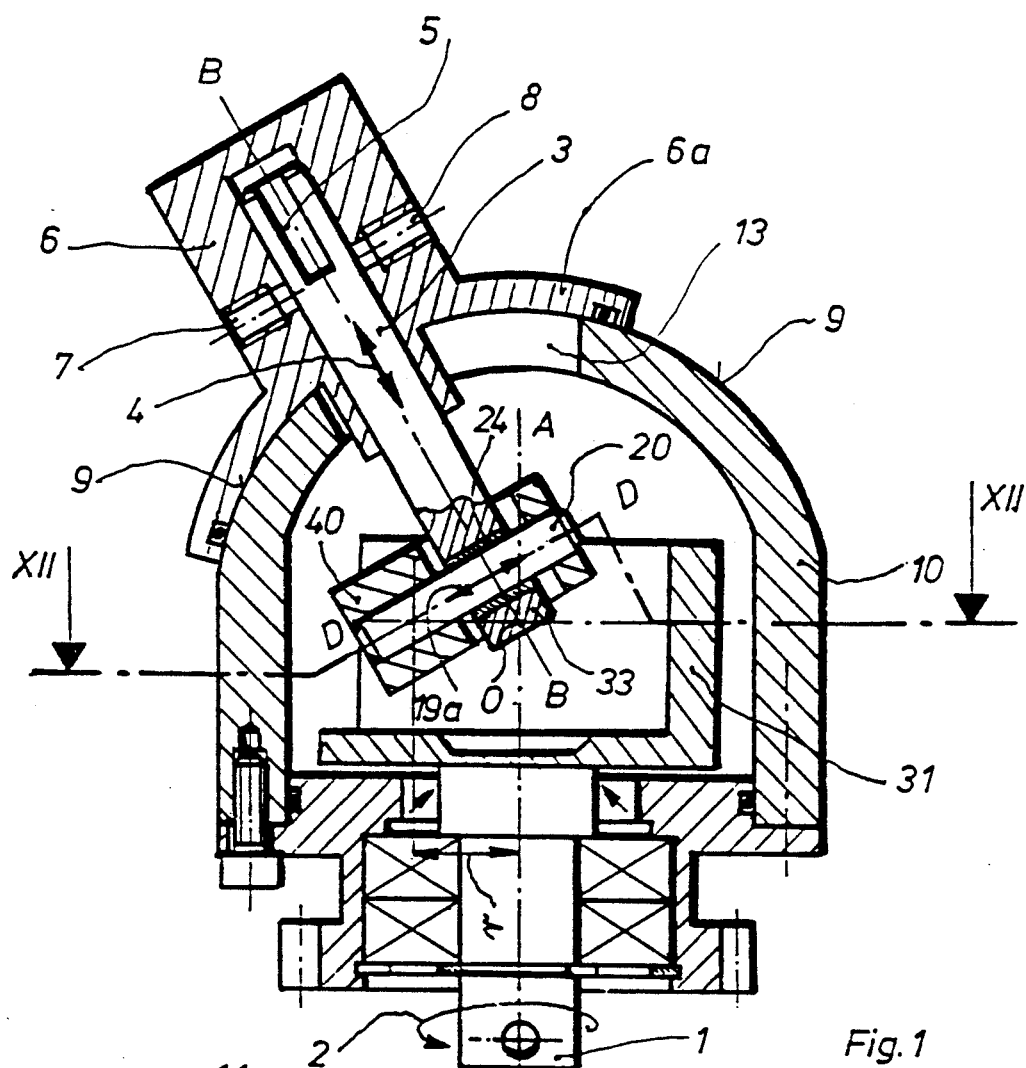

United States Patent [19]
Marpert et al.

[11] Patent Number: 5,163,877
[45] Date of Patent: Nov. 17, 1992

[54] JOINT FOR THE TRANSMISSION OF TORQUE FROM A FIRST SHAFT TO A SECOND SHAFT

[76] Inventors: Heinrich Marpert; Mark P. Marpert, both of Carlo-Mierendorff-Strasse 18, D-6300 Giessen, Fed. Rep. of Germany

[21] Appl. No.: 630,177

[22] Filed: Dec. 19, 1990

Related U.S. Application Data

[63] Continuation of Ser. No. 267,377, Nov. 4, 1988, abandoned.

[30] Foreign Application Priority Data

Nov. 17, 1987 [DE] Fed. Rep. of Germany ....... 3738951

[51] Int. Cl.⁵ .............................................. F16D 3/40
[52] U.S. Cl. .................................... 464/119; 464/112
[58] Field of Search ............... 464/106, 112, 119, 134, 464/136

[56] References Cited
U.S. PATENT DOCUMENTS
2,809,505 10/1957 Bouchard ............................ 464/119
3,529,441 9/1970 Pitner .................................. 464/119

FOREIGN PATENT DOCUMENTS
838552 5/1952 Fed. Rep. of Germany ...... 464/112
517426 7/1957 Italy .................................... 464/136

Primary Examiner—Daniel P. Stodola
Assistant Examiner—William G. Battista, Jr.
Attorney, Agent, or Firm—Edmund M. Jaskiewicz

[57] ABSTRACT

Joint for transmission of the torque of a first shaft to a second shaft so that the second shaft additionally makes a lifting movement, and the angle between the axes of the two shafts is adjustable, characterized by two bolts mounted to be rotatable and axially movable, advantageously in a connector between the shafts, and the bolt axes or their shortest interval is outside the point of intersection of the axes of the first and second shaft or outside the shortest interval of these shafts.

20 Claims, 11 Drawing Sheets

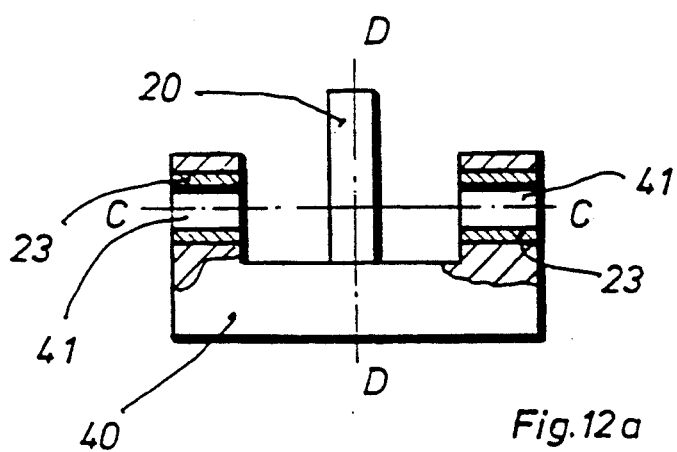 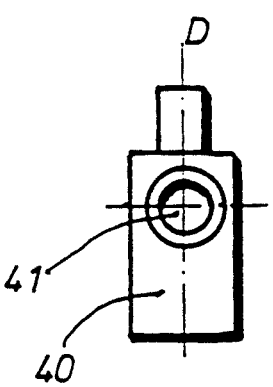
Fig.12a　　　Fig.12b
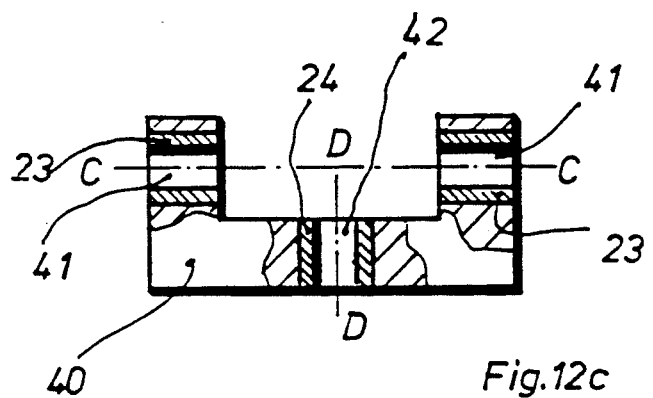 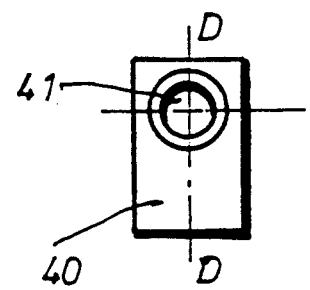
Fig.12c　　　Fig.12d
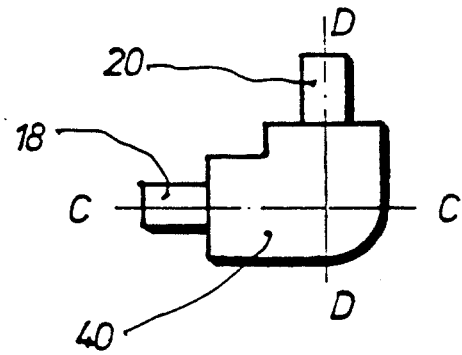 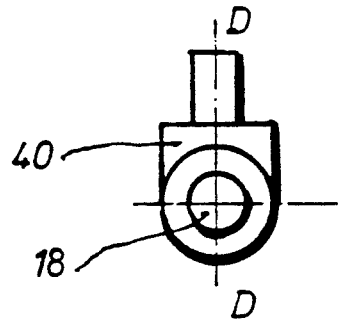
Fig.12e　　　Fig.12f
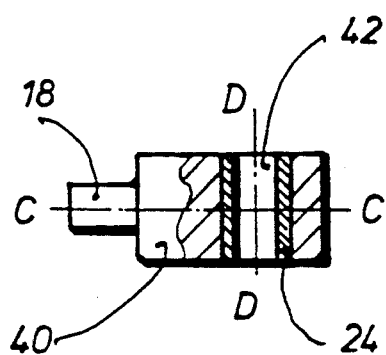 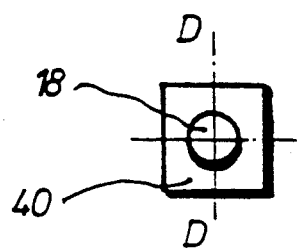
Fig.12g　　　Fig.12h

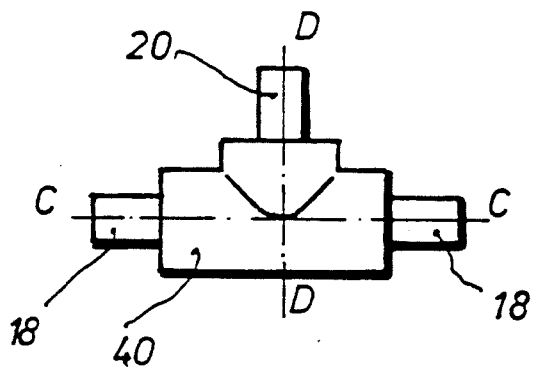 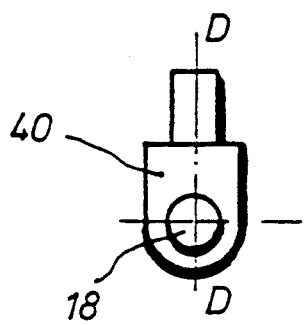
Fig.13a          Fig.13b
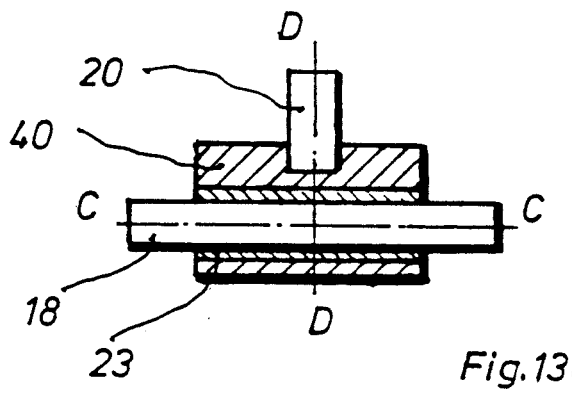 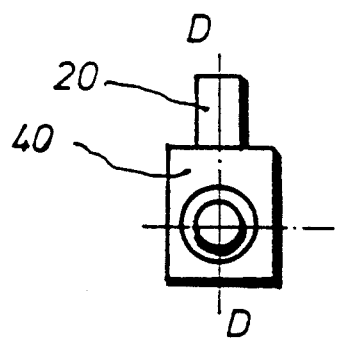
Fig.13c          Fig.13d
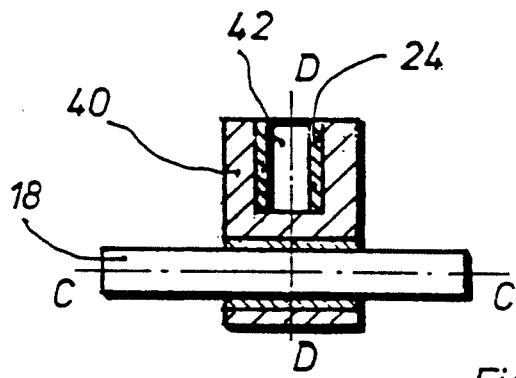 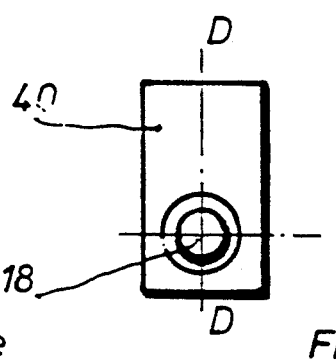
Fig.13e          Fig.13f
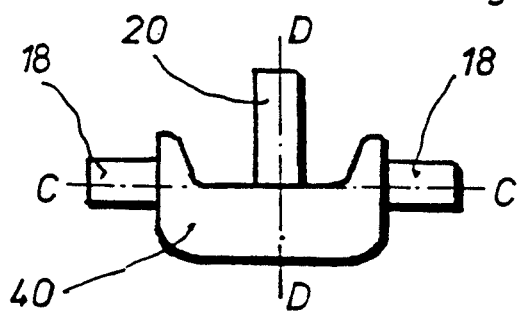 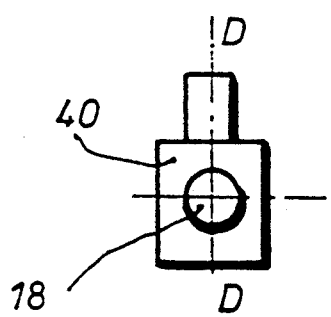
Fig.13g          Fig.13h

JOINT FOR THE TRANSMISSION OF TORQUE FROM A FIRST SHAFT TO A SECOND SHAFT

This is a continuation of application Ser. No. 267,377 filed Nov. 4, 1988, now abandoned.

DESCRIPTION

The invention relates to a connection between two shafts, in which the first shaft is rotatable only around its axis, but the second shaft is to perform both a rotation around its axis and an axial movement in the direction of its axis and is to make an adjustable or preset lifting movement. For example, a rotation of a crankshaft in an engine produces only a lifting movement of the piston rod of the piston that is to be moved, but causes no rotation. For this reason, in an internal-combustion engine intake and discharge valves are necessary, but are always spring-loaded and therefore often do not operate accurately enough for the intended purposes.

For this reason, connections are known in which the rotation from a first shaft is transmitted to a second shaft so that the second shaft makes both a rotation and a lifting movement. The lifting movement is achieved because the second shaft is inclined at an angle to the first shaft. The second shaft can carry a piston, in which a lateral opening is provided, which during both the rotation and lifting movement more or less opens or closes control slots in the cylinder. In this way very exact control results are obtained and no intake or discharge valves are needed.

Such devices are used for kinetic energy transmission but also for accurate driving of piston pumps or diaphragm pumps, especially control piston pumps, since intake and discharge of the medium without valves can be determined very exactly by the provided slots both by the rotation and by the lifting movement of the piston.

Such devices have a practical application, for example in the field of chemistry, where accurately metered amounts, for example a medicine, are to be filled in ampules, but also in the food field so that the accurately metered foods can be packed. Since each pump can conversely be used as drive for a motor, there is a great number of further possibilities of use.

The transmission of the rotation of a first shaft into a rotation and lifting movement of a second shaft is basically known, for example, from Dubbel, "Taschenbuch des Ingenieurs" [Engineer's Handbook], 14th edition, page 511 lower right. Here a swash plate in connection with an inclined shaft pump is used for the drive. This embodiment is quite complicated and does not meet the accuracy requirements that the invention strives for. From the book by Duerr and Wachter "Hydraulik in Werkzeugmaschinen" [Hydraulics in Machine Tools], 6th edition, on pages 77 and 78 such pumps are presented. It is seen at first glance that these pumps require a very complicated and expensive connection between the individual shafts.

The object of the invention is to indicate a connection between the shafts, in which the angle of incidence of the second shaft can be of practically any size, but at least can far exceed the 15° to 20° achieved by the prior art, and which further permits an extremely accurate setting of the extent of the lifting.

This object is achieved by a joint for transmission of the torque of a first shaft to a second shaft so that the second shaft additionally makes a lifting movement, the angle between the axes of the two shafts is adjustable, and having two bolts mounted to be rotatable and axially movable, preferably in a connector between the shafts, and the bolt axes or their shortest interval is outside a point of intersection of the axes of the first and second shafts or outside the shortest interval of the shafts.

According to this solution the first shaft is only rotatable, i.e., not axially movable. It carries in a guide or the like an axially movable and also rotatable bolt. This bolt is connected to the second obliquely positioned shaft, namely, by fasteners, which preferably are also axially movable and rotatable, for example another bolt. The bolts themselves can be fastened to one another at a fixed angle, especially a right angle, if only their guide means in the shafts or connectors are suitably designed. The point of intersection of the axes of the bolts, as will be disclosed below, is not to coincide with the point of intersection of the axes of the shafts. In this case, as was found, the first bolt or its bearing makes a circular movement around the axis of the first shaft, and the second bolt makes a circular movement around the axis of the second shaft, but at the same time also a lifting movement, since the points of the joint moved around the axes actually first also make a circular movement, so that according to the laws of descriptive geometry two cylinders, obliquely positioned to one another, are produced, which form a plane of section and thus a rotating surface for the two bolts, which according to mathematical findings form an ellipse. Further, the axes of the two shafts can intersect at a point, if only an interval of the point of intersection of the bolts is present. But the axes of the two shafts can run past one another, so that at a very specific point they exhibit a shortest distance from one another. Since the fasteners of the second shaft describe an ellipse, the additional offset movement (lifting movement) necessarily takes place by their eccentricity.

If the axes of the two shafts do not meet but run past one another, an additional elliptic superposition of the movement paths in regard to the movement of the second shaft is obtained. But basically nothing is changed as a result.

The extent of the eccentricity of the ellipse and thus of the lifting movement of the second shaft depends not only on the interval of the points of intersection but also on the angle of incidence of the second shaft.

The interval of the point of intersection of the axes of the two bolts or if they do not intersect, again the position of the shortest interval of the axes, goes into the calculation.

Determined by the laws of mathematics, according to the invention the angle of incidence between the shafts can be any size and thus also the extent of the lifting, which was not possible according to the prior art.

Further features of the invention can be gathered from the subclaims as well as the description of the embodiments.

Figure 2:
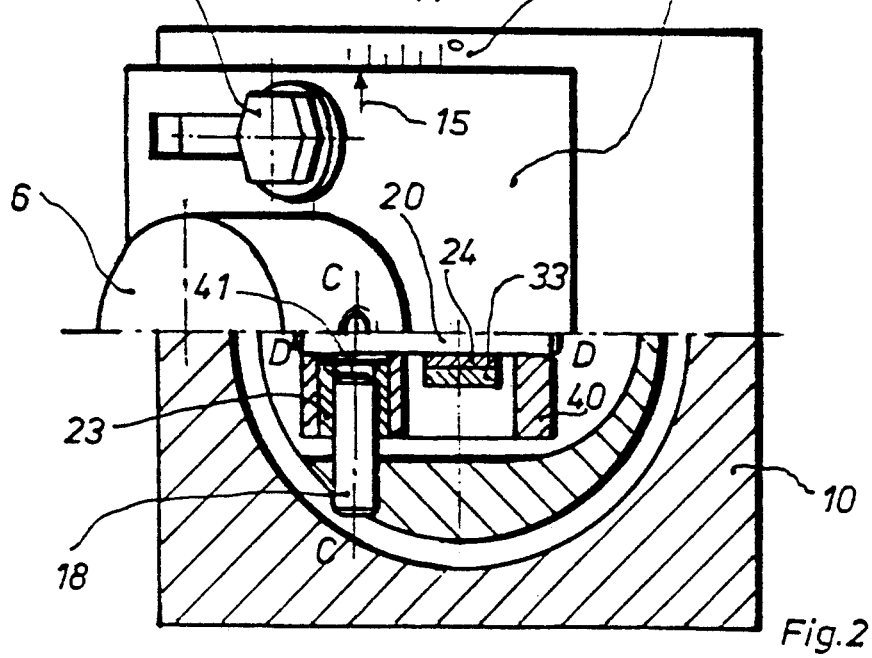
Figure 3:
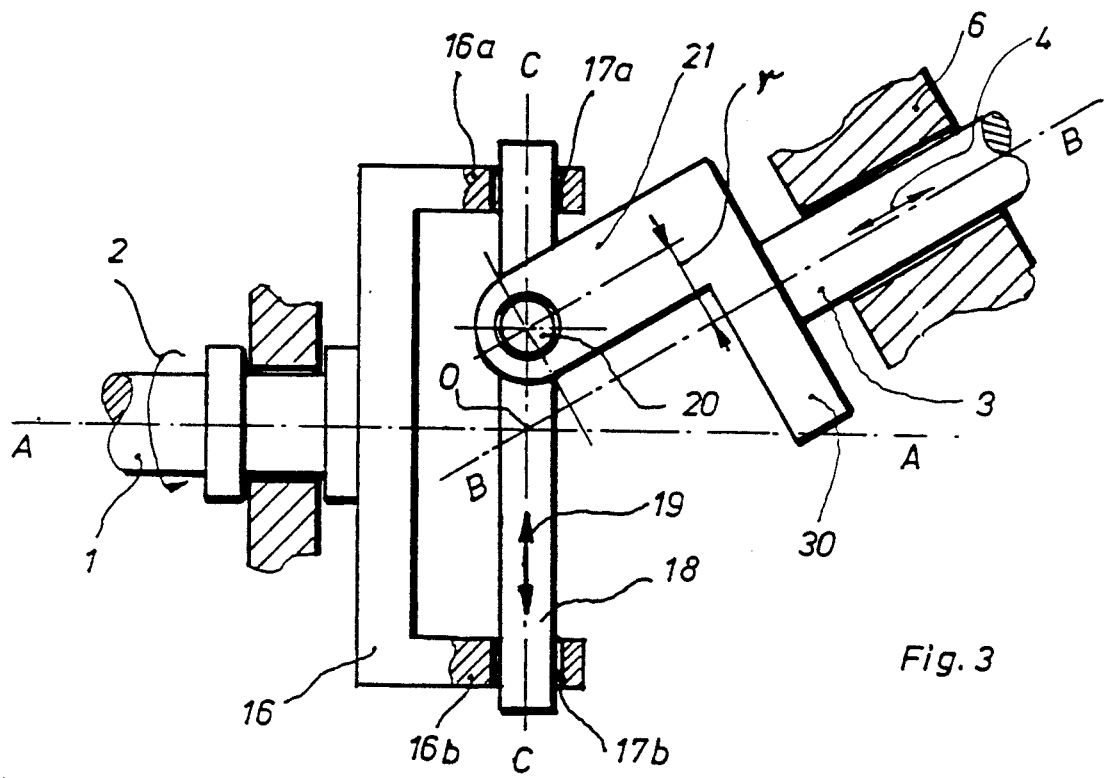
Figure 4:
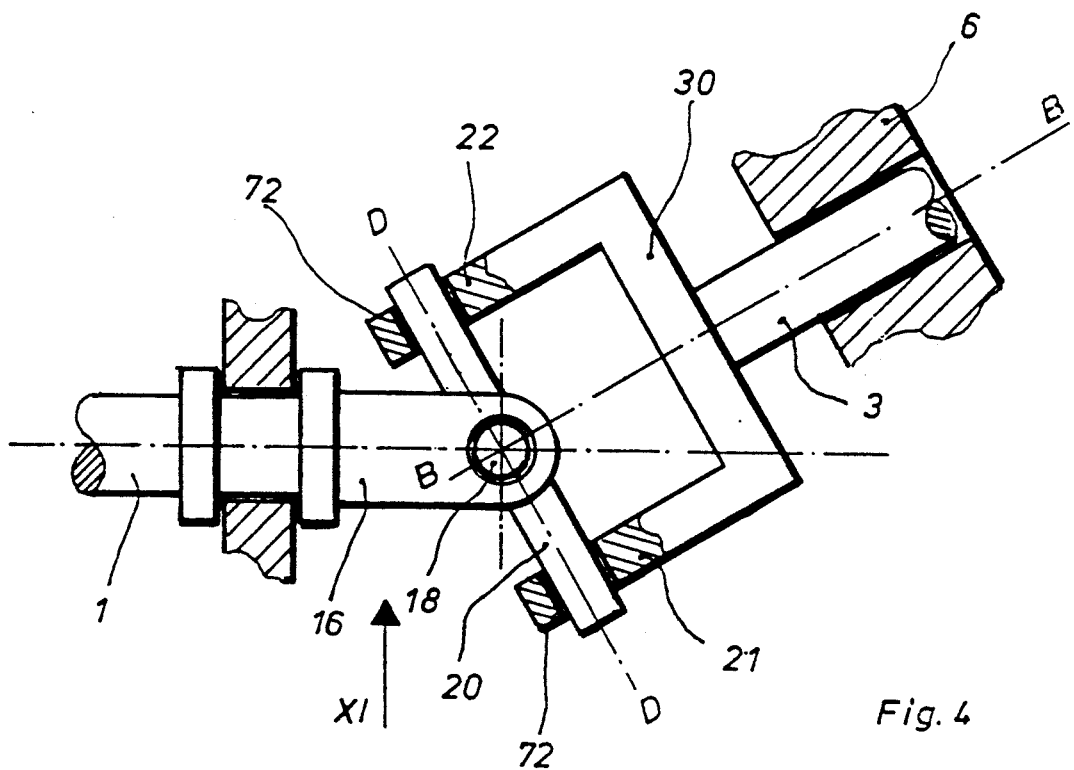
Figure 5:
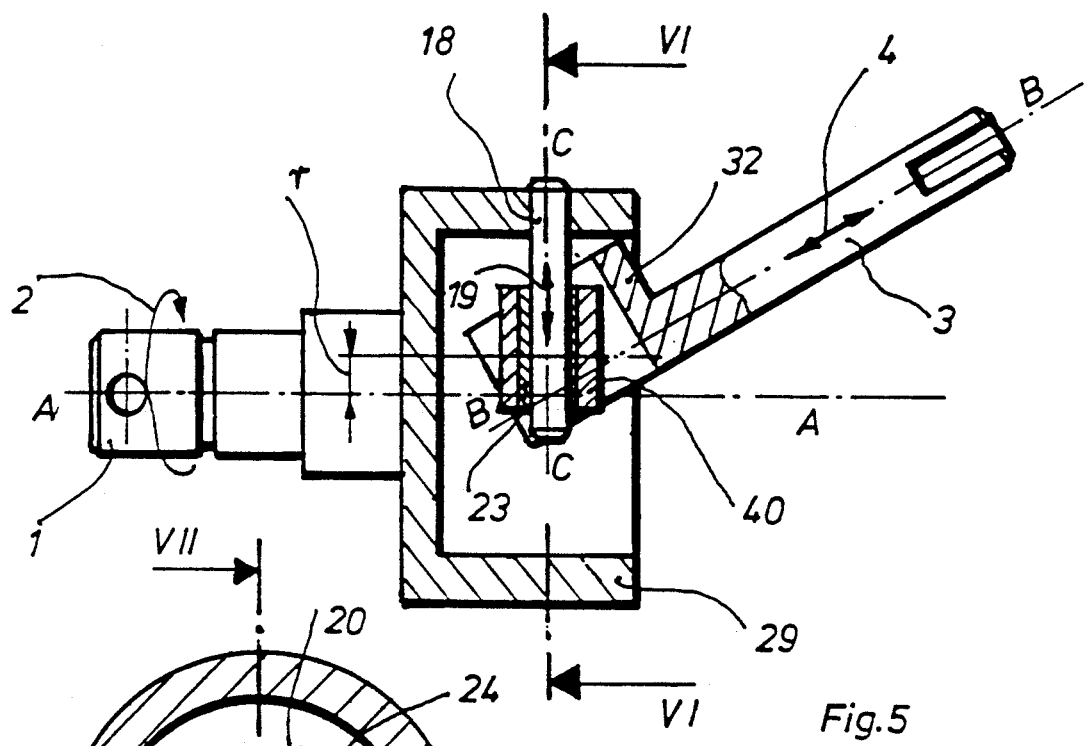
Figure 6:
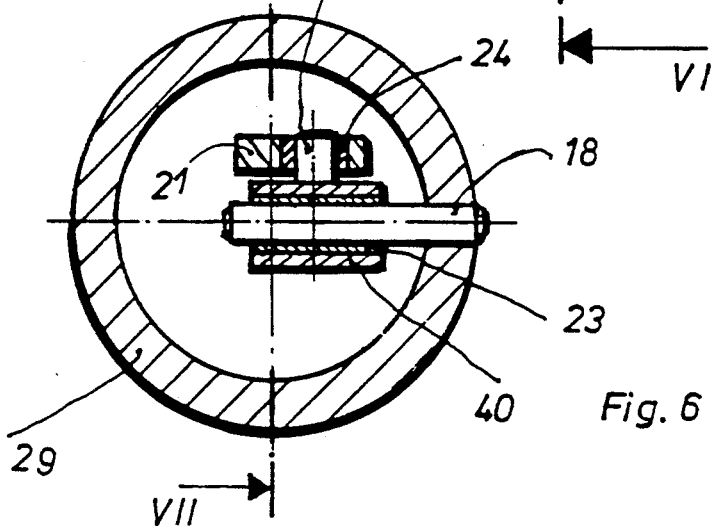
Figure 7:
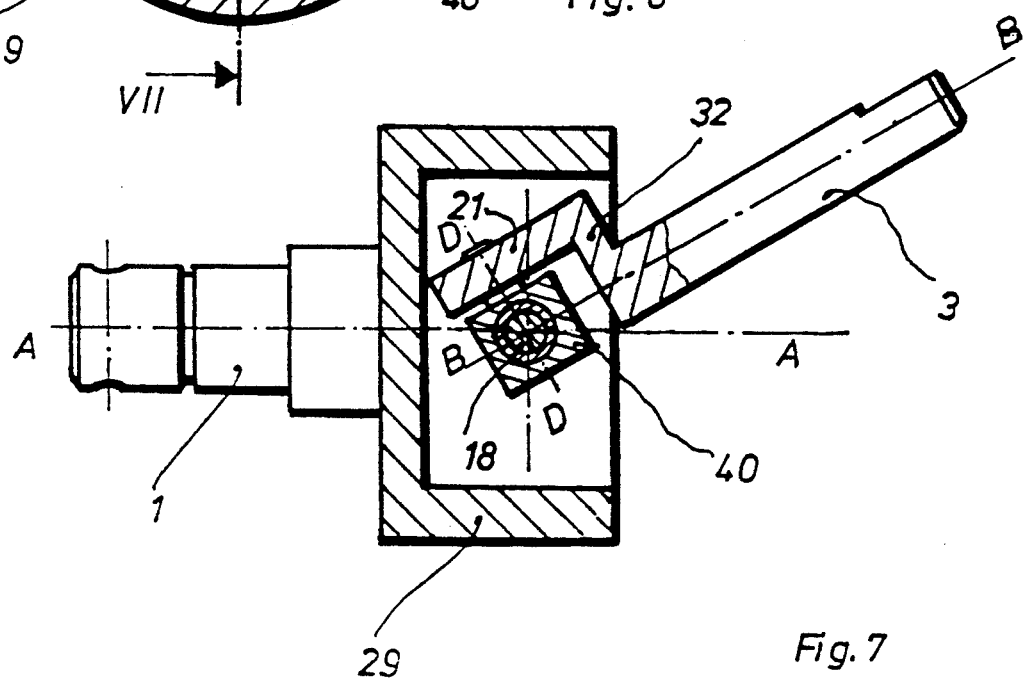
Figure 8:
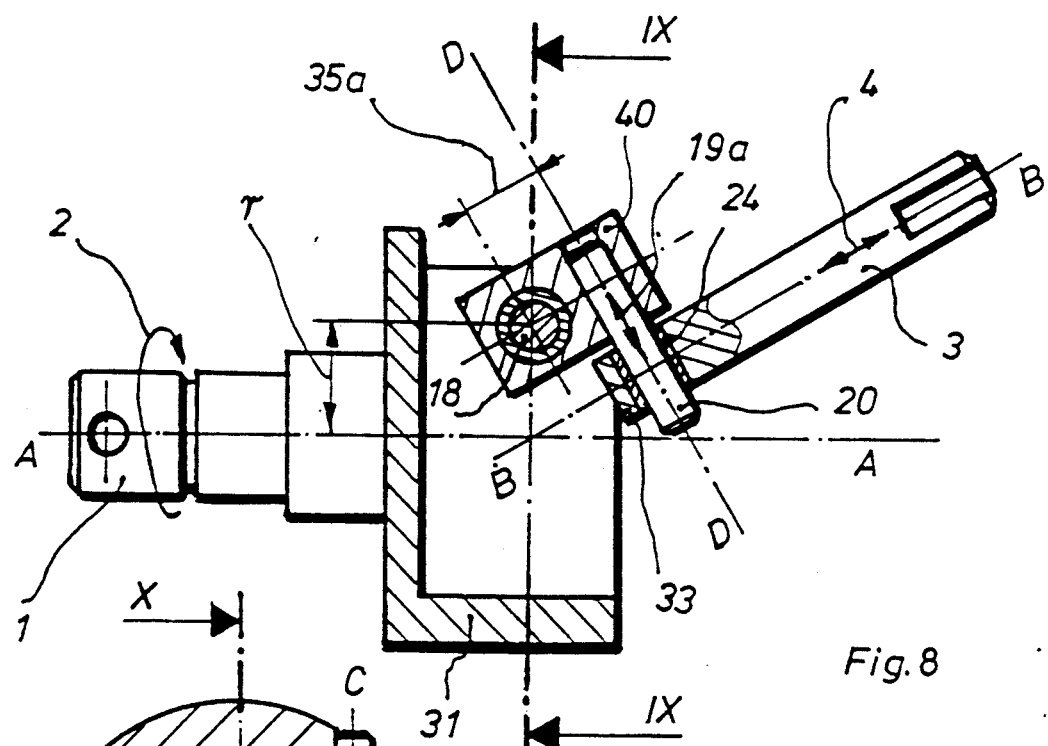
Figure 9:
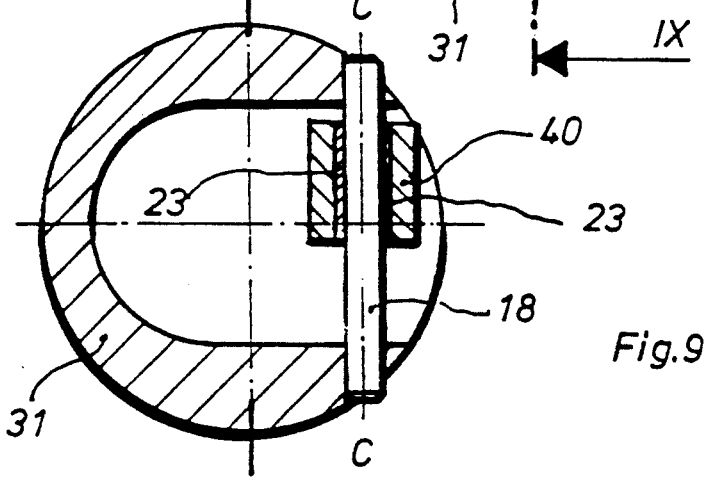
Figure 10:
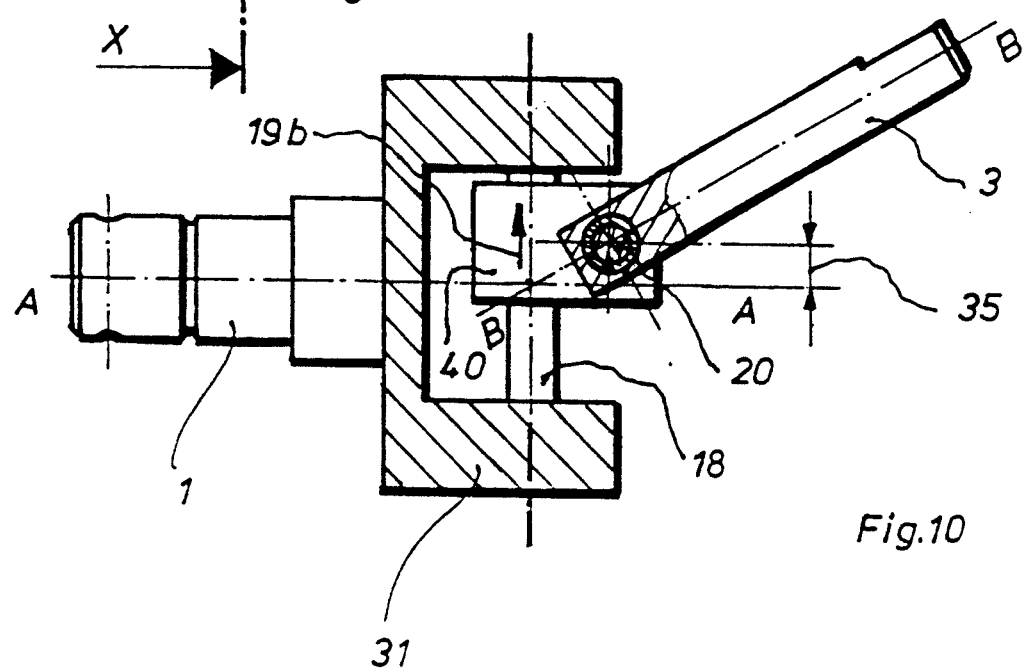
Figure 15:
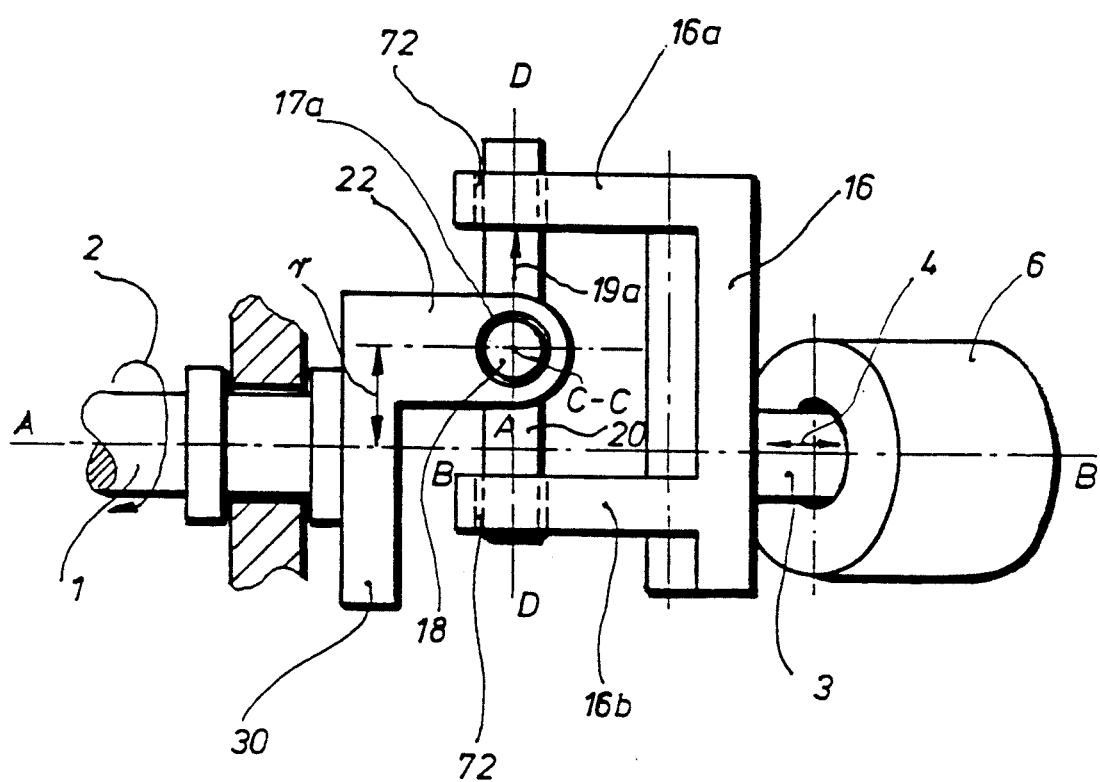

Embodiments of the invention are represented in the drawing and show in:

FIG. 1, a cross section through a metering pump, for example for measuring and control tasks with adjustable lifting;

FIG. 2, top view of FIG. 1, partially sectioned along the line XII—XII;

FIG. 3, a representation for explanation of the mode of operation of the invention, partially sectioned;

FIG. 4, the embodiment according to FIG. 3, but with shaft turned 90°;

FIG. 5, a cross section through a modified embodiment;

FIG. 6, a section along line VI—VI of FIG. 5 of a shaft turned 90°;

FIG. 7, a section along line VII—VII of FIG. 6;

FIG. 8, a cross section through a modified embodiment;

FIG. 9, a section along line IX—IX of FIG. 8 with shaft turned 90°;

FIG. 10, a section along line X—X of FIG. 9;

FIG. 11a to 11f, partial sections and side views of different connectors for the bolts according to the invention;

FIG. 12a to 12h, partial sections and side views of different connectors for the bolts;

FIG. 13a to 13h, partial sections and side views of different connectors for the bolts;

FIG. 14a to 14f, partial sections and side views of different cross connections;

FIG. 15, is a modification of the embodiment of FIGS. 3, 4

Figure 16:
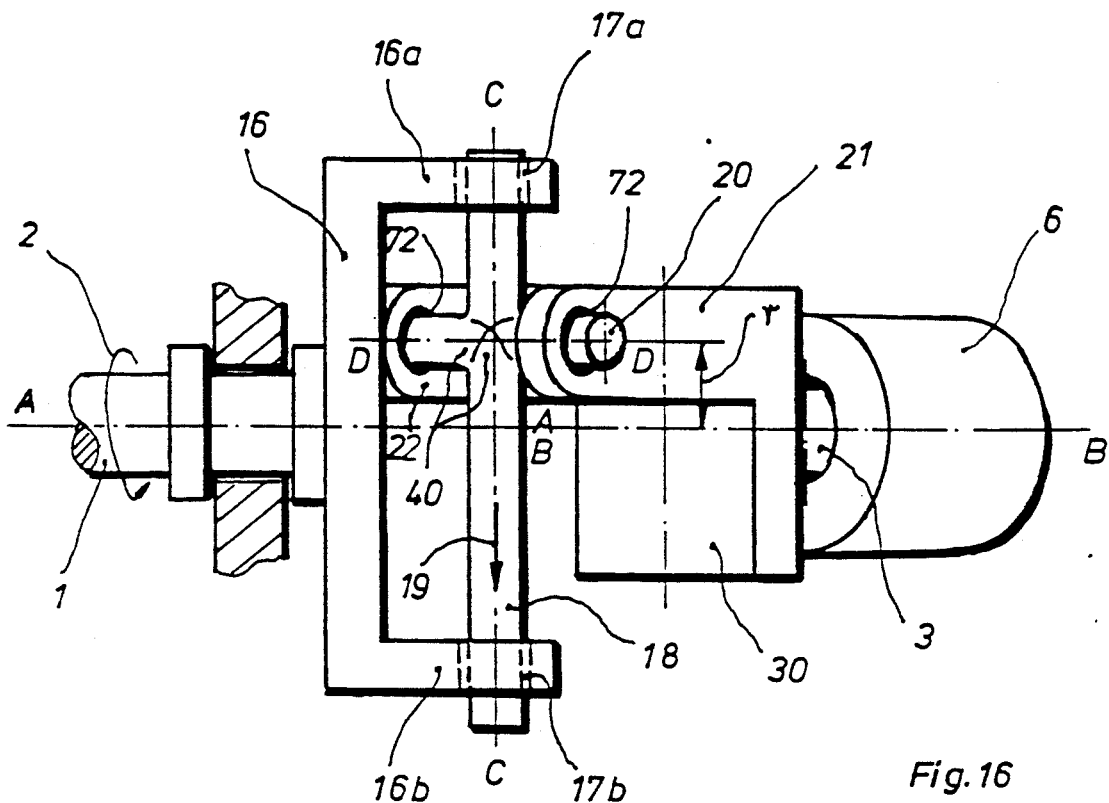
Figure 17:
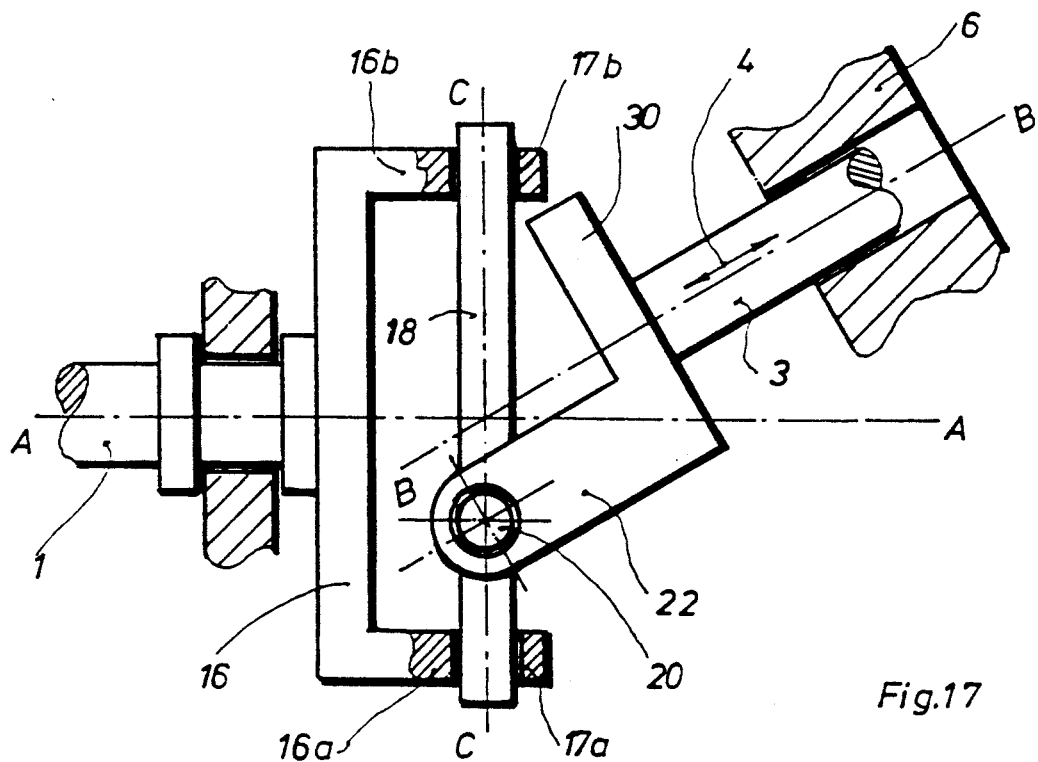
Figure 18A:
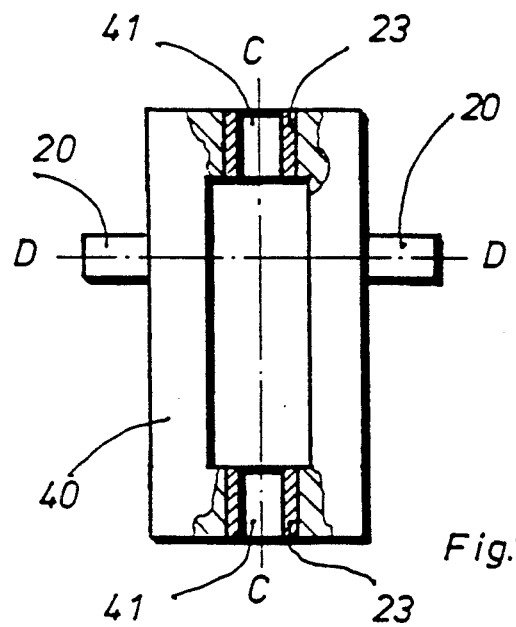
Figure 18B:
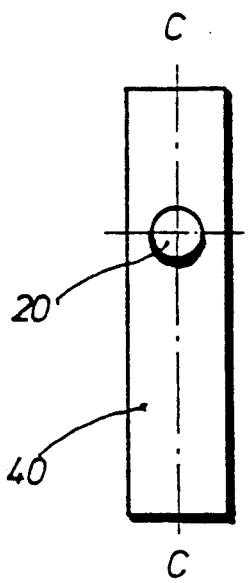
Figure 18C:
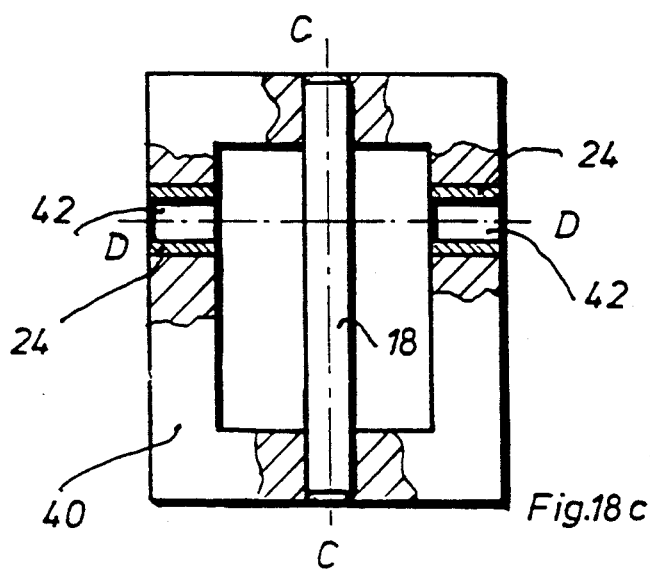
Figure 18D:
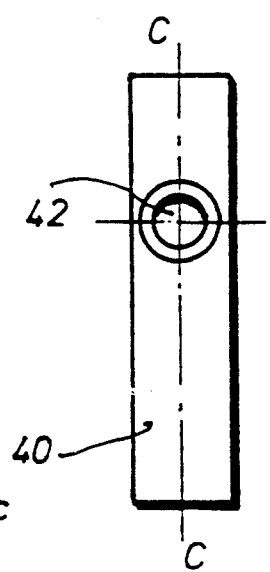
Figure 18E:
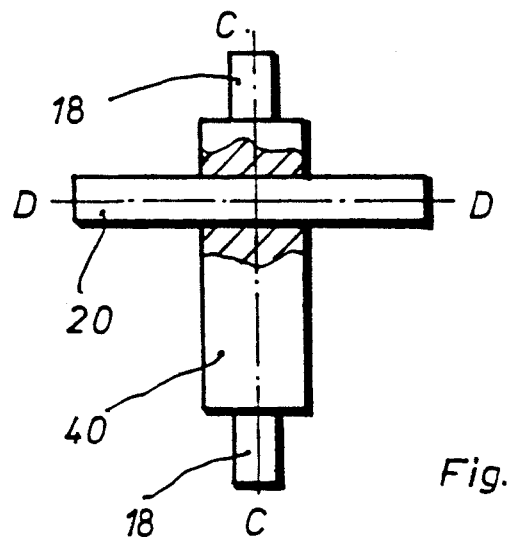
Figure 18F:
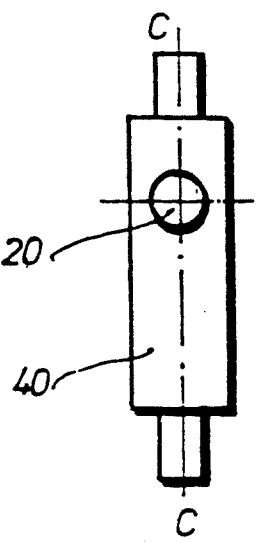

FIG. 16, view of FIG. 4 viewed in the direction of arrow XI;

FIG. 17, shows the embodiment of FIG. 3 but with the shafts turned 180°;

FIG. 18a to 18f, partial sections and side views of different cross connectors.

According to FIG. 1 a drive shaft (1), rotatable in the direction of arrow (2), is provided, which is not movable in the axial direction. The rotation of drive shaft (1) is to be transmitted to shaft (3), so that it makes a rotation around its axis (B—B), but also at the same time a lifting movement in the direction of arrow (4). In this case, shaft (3) is provided with slots (5), and housing or cylinder (6) carries corresponding intake (7) and discharge (8) slots, so that if a movement of shaft (3), caused by the rotation of shaft (1), in the direction of arrow (4) takes place, more or less gas or a liquid or the like can flow through slots (7, 8). The rate of the amount of flow is adjustable, namely by the angular position of axis (B—B) to axis (A—A) of shaft (1), by shaft (3) being placed in housing (6) which is designed as a cup (6a) and is adjustably placed on a corresponding countersurface (9) of housing (10). The angle between axes (A—A and B—B) at any time can be adjusted and fixed within preset play (13) by screws (11) (FIG. 2). A dial (14) in connection with a mark (15) provided on part (6a) allows the amount of adjustment and thus the lift to be read, if the device according to FIG. 1 is used as a metering pump.

So that the rotation of shaft (1) will be transmitted from shaft (1) to shaft (3), and shaft (3) at same time will make a lifting movement of the preset amount, according to FIG. 3 and 4 shaft (1) ends in a fork (16), which according to FIG. 3 with its prongs (16a, 16b) is placed symmetrically to axis (A—A), but could also be placed asymmetrically to axis (A—A). Guides, in this case holes (17a, 17b) for bolt (18), which can move radially in the direction of arrow (19), are provided in prongs (16a, 16b). Bolt (18), for reasons still to be described, is not only axially movable but also rotatable around its axis (C—C). As can be seen in FIG. 4, bolt (18) is solidly connected to a second bolt (20), which is placed perpendicular to first bolt (18). Bolt (20) is mounted in holes (72) of legs (21, 22) of another fork (30) which is carried by shaft (3).

As can be seen, the two bolts (18, 20) form a cross connection between shafts (1, 3), which according to the invention is identified as a universal joint.

The mode of operation of the device is as follows: if shaft (1) rotates in the direction of arrow (2), fork (16) correspondingly rotates. Bolt (18) (FIG. 3), mounted in fork (16), correspondingly rotates with it. Since it is connected crosswise to bolt (20) and mounted in holes (72), the rotation of shaft (1) is transmitted to shaft (3). Since forks (16, 30), in their rotation, describe circular cylinders, bolt (18) must be mounted axially movable in the direction of arrow (19). Further, as will be seen, the axes of bolts (18, 20) intersect at interval (r) from the point of intersection of the axes (FIG. 3) of shafts (1, 3) so that at the rotation of shaft (3) around its axis a lifting movement in the direction of axis (B—B) of shaft (3) takes place.

This is the basic principle of the invention. It can be modified in many variants, for interval (r) determines not only the extent of the lifting movement of shaft (3) but also the position to one another of the points of intersection of the axes of the shafts as well as the points of intersection of the bolts, and further said axes do not have to intersect even at one point. In this case the shortest interval of the axes that belong together enters into the calculation.

According to FIG. 5 to 7, shaft (1) ends in a cup-shaped or cylindrical drum (29), in which bolt (18) has one end mounted in the wall of the drum 29, and its other end in a ceramic-lined hole (23) of a connector (40). Element (32) on the end of shaft 3 and carrying connector (40), as can be seen especially in FIG. 7, is bent on one side to axis (B—B) of shaft (3), to define an L-shaped connection to shaft (3). Connector (40) with its ceramic lined hole (23) is designed long enough so that it replaces the two holes (17a, 17b) of FIG. 3. This design is space-saving since only one bearing element is necessary for bolt (18). The same applies to a ceramic lined hole (24), which is placed in the L-shaped leg (21) of element (32), to support one end of bolt (20) as seen in FIG. 6.

According to FIG. 8, 9 and 10, bolt (18) is carried by a yoke (31), which is connected solidly with shaft (1). Shaft (3) is connected by means of connector (40) having ceramic lined hole (23) and connected (40) is rotatable around axis (D—D) by means of bolt (20), and in addition shaft (3) is axially movable (FIG. 8). The mode of operation of this device is the same as in the preceding example in FIGS. 5–7 only here an additional longitudinal movement (35) in the direction of arrow (19b) takes place, namely by offset (35a), which is produced between axes (C—C and D—D) of the bolts. In this case, several running curves are superposed. This design can be favorable on design grounds, since it is space-saving. Spur (30) with legs (21, 22) (see FIGS. 3 and 4) forms form a common structure (33) with shaft (3).

It is essential that a connector (40) always be provided between shaft (1) and shaft (3). Bolts (18, 20) can be mounted in or on connector (40) or can be fastened on fork (16, 30) and/or even on shafts (1, 3). Correspondingly holes (17a, 17b, 72) in fork (16) and/or in connector (40) can be provided as holes (41, 42). The holes can be designed with ceramic liners (23, 24) of any type, so that the necessary rotation and axial movement of the bolts as well as shaft (3) in the direction of arrows (19, 19a, 19b) is assured.

The connection of shafts (1 and 3) need not take place by a spur carried by shaft (1), for example, the fork (16) according to FIG. 3, but the connection is also possible, as already shown in FIG. 4, by a spur, for example, the fork (30) carried by shaft (3). But the connectors according to FIG. 3 and 4 are placed symmetrically to the axes both of shaft (1) and shaft (3). This symmetry is not necessary, as FIG. 15 shows. Here spur (16), which is carried by shaft (3), is designed as a U-shaped fork (16a, 16b). Axes (A—A and B—B) of the two shafts (1, 3) seem here to be co-extensive. This only seems so, since the element of FIG. 3 or FIG. 4 is looked at from above. Fork (16a, 16b) is placed laterally offset from axis (B—B) and thus also from axis (A—A). It carries recesses (72), shown in broken lines, in which bolt (20) can move radially back and forth and is rotatable. Spur (30) which is constructed L-shaped and is carried by shaft (1), engages bolt (18). In turn, spur (16) is designed fork-shaped, so that it can be connected to bolt (18, 20) according to one of cross joints according to FIG. 11 to 14.

Bolts (18, 20) can be mounted as cross-shaped solid connector (40) according to FIG. 3, 4, 15, 16 and 17 with two of its ends in holes (17a, 17b, 72) in a fork (16, 30) carried by shafts (1, 3). A cross-shaped uniform part (40) is formed, which lies in holes (72) of fork piece (16) constructed L-shaped, which again is connected solidly to shaft (3).

FIG. 11a to 11f show various modifications of connector (40) for this purpose. Bolts (18, 20) are outside axes (A—A or B—B) of shafts (1 or 3). In the cases in which they are mounted on one side, bearing cages or liners (23, 24) are advantageously designed and placed so that success is guaranteed.

Figure 11A:
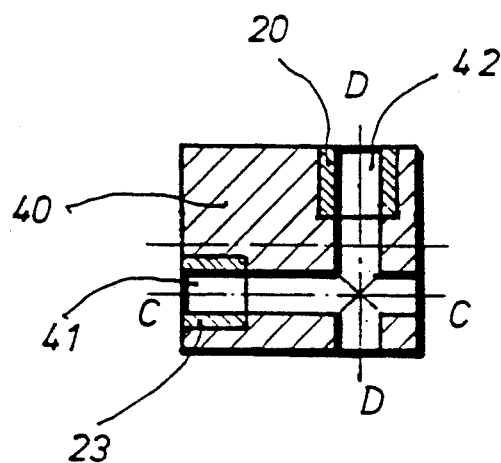
Figure 11B:
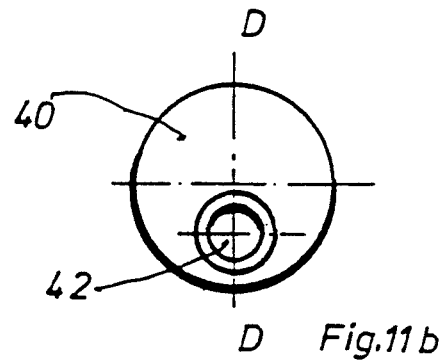
Figure 11C:
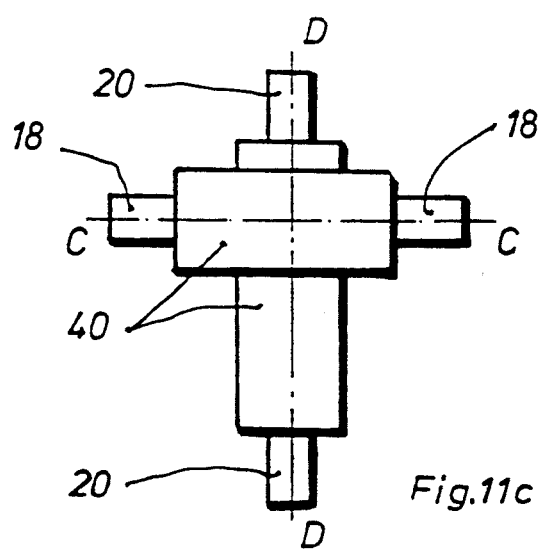
Figure 11D:
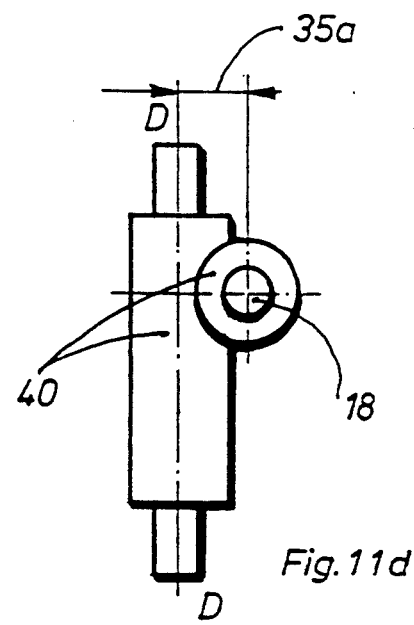

In FIG. 11d bolt (18) is laterally offset to axis (D—D), for example, by amount (35a) by which a second elliptical movement is obtained.

Figure 11E:
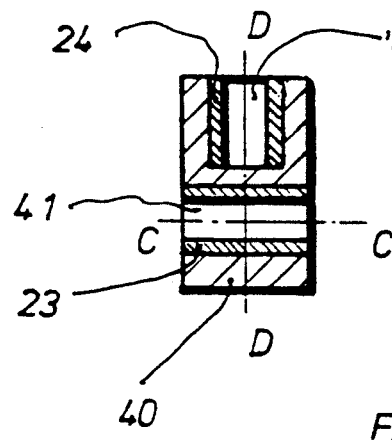
Figure 11F:
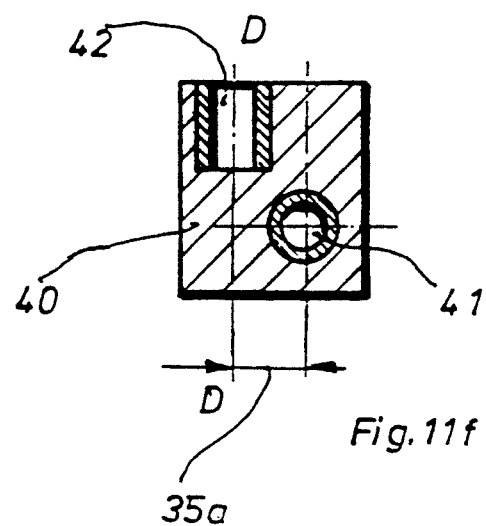
Figure 14A:
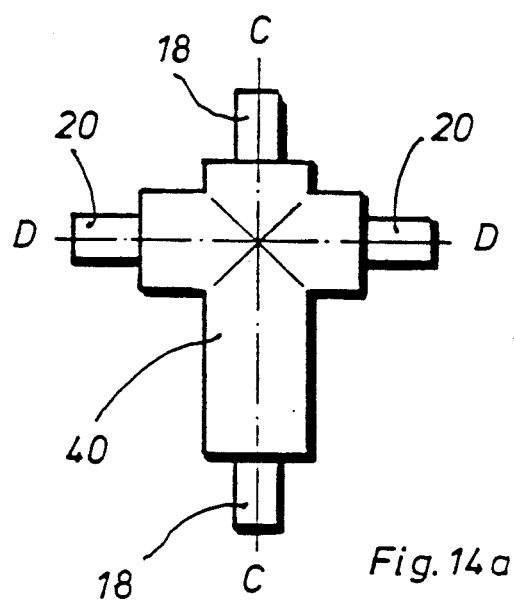
Figure 14B:
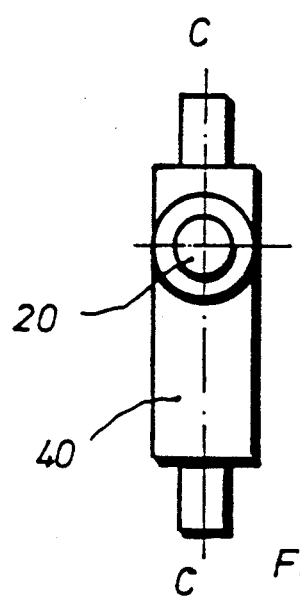
Figure 14C:
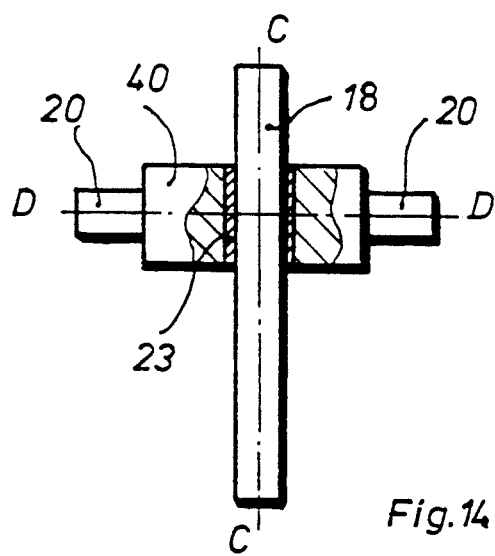
Figure 14D:
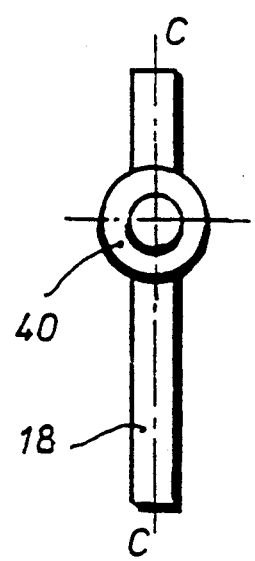
Figure 14E:
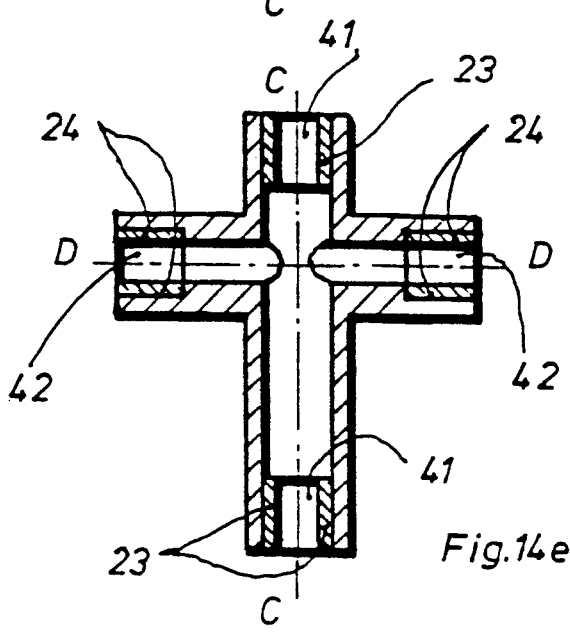
Figure 14F:
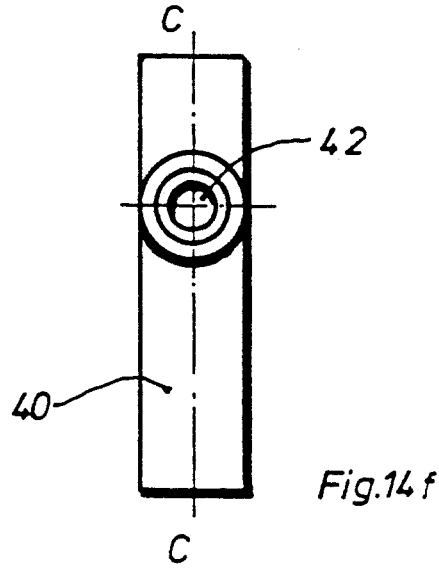

FIG. 11e and 11f show the bearing in respective connectors (40). Shaft (3) enters only with one and of bolt (20) seated in hole (42) in part (40), whereas bolt (18) is mounted in hole (41) of connector (40). Guides (23, 24) for example can consist of a ceramic material, so that they do not overheat and the device can therefore also be used for pumping of hot liquids.

FIG. 12a to 12h show other modifications of the connection of shafts (3 and 1) by various forms of connectors (40).

According to FIG. 12a connector (40) is U-shaped. Shaft (3) is mounted on a stud, which replaces bolts (20). The ends of bolt (18), which is divided here, are seated in recesses (41).

According to FIG. 12a to 12d and 12e to 12h the end of shaft (3) engages in a recess (42) (FIG. 12c) of connector (40). In this design bolt (18) can again go through.

FIG. 12e and 12f show an L-shaped angular bend of the connector (40). Shaft (3) engages fork (16) at (20) on or in (18).

FIG. 12g and 12h show a similar design. Bolt (18) again engages fork (16). But bolt (20) passes through a hole (42) to engage part (30).

Further similar designs of T-shaped connector (40) are shown in FIG. 13a to 13h, and it is to be pointed out that, according to FIG. 13a and 13b, bolts each of (18, 20) can be made in two parts. According to FIG. 13c and 13d bolt (18) is in one piece, i.e., the bolt goes through sleeve (23). The same is true for the design according to FIG. 13e and 13f. According to FIG. 13c and 13d shaft (3) was seated with its end (33) on pin (20). According to FIG. 13e and 13f it is set in recess (42) of the connector (40) by means of bolt (20) fastened in it.

FIG. 13g and 13h show a similar T-shaped cross connector.

FIG. 14a to 14f also show further cross connectors.

FIG. 18a to 18d show O-shaped cross connectors.

What is claimed is:

1. A joint for transmission of torque from a first shaft (1) to a second shaft (3) such that the second shaft also has a predetermined magnitude of axial movement, the rotational axes of said shafts (A—A, B—B) being disposed at an angle to each other and said angle being adjustable, said shaft rotational axes being one of intersecting at a first point or crossing each other to define a first interval at the shortest distance between said crossing axes, means on the ends of said shafts for radially-/slidably and rotatably retaining first and second bolts (18, 20) respectively, means for connecting said first and second bolts together at a right angle to each other, said bolts having first and second longitudinal axes (C—C; D—D) respectively which are one of intersecting at a second point or crossing over each other to define a second interval at the shortest distance between said crossing bolt longitudinal axes, said second point and said second interval being disposed outwardly of said first point and said first interval thereby resulting in said axial movement of said second shaft.

2. A joint according to claim 1 wherein said bolt retaining means on said first shaft (1) comprises a fork (16) having holes (17a, 17b) or guides outside said axis of rotation (A—A) of said first shaft (1) to retain said first bolt (18) rotatably and axially movable in said holes or guides, said first bolt (18) connected to said second bolt (20) mounted on the second shaft.

3. A joint according to claim 2 wherein said fork has a pair of spaced prongs (16a, 16b) and said holes being in said prongs respectively.

4. A joint according to claim 1 wherein bolt retaining means on said second shaft (3) comprises a spur (30) which carries said second bolt (20) which is connected to said first bolt (18).

5. Joint according to claim 4, wherein said spur of said second shaft (3) is L-shaped to define an L-leg in which is mounted a guide (24) for second bolt (20).

6. Joint according to claim 5, wherein said L-shaped spur (30) is disposed unsymmetrically to axis (B—B) of second shaft (3), and comprises a U-shaped part having legs (21, 22) offset to axis (B—B) of the second shaft, said legs carry said second bolt (20) rotatably and axially movable.

7. Joint according to claim 1, wherein the longitudinal axes of said first and second bolts (18, 20) are aligned perpendicular to one another and intersect.

8. Joint according to claim 7, wherein the longitudinal axes of said first and second bolts (18, 20) cross over each other at a distance therebetween.

9. Joint according to claim 1, wherein second shaft (3) actuates a cylinder (6) having intake and discharge slots (7,8).

10. Joint according to claim 9, wherein said second shaft (3) for control purposes comprises a piston and has at least one recess therein which successively opens the intake and discharge slots of said cylinder.

11. Joint according to claim 1, wherein said bolts and their respective guides are disposed at right angles to the axes of rotation of said two shafts (1, 3) and said axes (A—A and B—B) of said first and second shafts (1, 3) intersect at one point.

12. Joint according to claim 1, wherein the axes of said two shafts (1, 3) cross each other at a distance therebetween.

13. Joint according to claim 1, wherein the longitudinal axis of first bolt (18) is disposed laterally to the axis of rotation (A—A) of said first shaft.

14. Joint according to claim 1, wherein the longitudinal axis of first bolt (18) is disposed laterally to the axes of rotation (A—A, B—B) of said two shafts (1, 3).

15. Joint according to claim 1, wherein the angle between shaft axes (A—A and B—B is fixed.

16. A joint according to claim 1 wherein said means on the end of said second shaft for retaining said second bolt comprises a radial opening in the end of said second shaft in which said second bolt is rotatably and axially movably journaled.

17. A joint according to claim 1 wherein said means for connecting said first and second bolts together comprises a connector having two holes therein to rotatably and axially movably recieve at least portions of said first and second bolts therein.

18. Joint according to claim 17 wherein the holes for said bolts are lined with a wear-resistant, heat-resistant and corrosion-resistant material comprising one of ceramic, stainless steel, plastic, and carborundum.

19. Joint according to claim 17 wherein one of said bolts is divided and has end parts engaged in the connecter.

20. A joint according to claim 1 wherein said bolt retaining means comprises a cylinder having a closed end attached to a said shaft, there being opposed holes in a wall of said cylinder to retain a said bolt therein.

* * * * *